United States Patent
Kotecha et al.

(10) Patent No.: US 10,299,094 B2
(45) Date of Patent: May 21, 2019

(54) HSS-BASED APPLICATION AUTHORIZATION FOR MACHINE-TYPE-COMMUNICATIONS

(71) Applicant: Verizon Patent and Licensing Inc., Arlington, VA (US)

(72) Inventors: Lalit R. Kotecha, San Ramon, CA (US); Thomas W. Haynes, Concord, GA (US); Ye Huang, San Ramon, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 103 days.

(21) Appl. No.: 15/420,481

(22) Filed: Jan. 31, 2017

(65) Prior Publication Data

US 2018/0220256 A1    Aug. 2, 2018

(51) Int. Cl.
| | |
|---|---|
| *H04W 4/70* | (2018.01) |
| *H04W 12/08* | (2009.01) |
| *H04L 29/08* | (2006.01) |
| *H04W 12/06* | (2009.01) |

(52) U.S. Cl.
CPC .............. *H04W 4/70* (2018.02); *H04L 67/306* (2013.01); *H04W 12/08* (2013.01); *H04W 12/06* (2013.01)

(58) Field of Classification Search
CPC ... H04W 4/70; H04W 12/08; H04W 72/0413; H04L 67/306
See application file for complete search history.

(56) References Cited

U.S. PATENT DOCUMENTS

| | | | | |
|---|---|---|---|---|
| 2012/0317224 | A1* | 12/2012 | Caldwell | H04L 45/745 709/217 |
| 2014/0242952 | A1* | 8/2014 | Zhang | H04W 4/70 455/411 |
| 2014/0349614 | A1* | 11/2014 | Starsinic | H04W 4/70 455/411 |
| 2016/0337841 | A1* | 11/2016 | Won | H04W 4/70 |
| 2017/0195822 | A1* | 7/2017 | Watfa | H04W 4/005 |
| 2018/0324652 | A1* | 11/2018 | Ryu | H04W 8/04 |

OTHER PUBLICATIONS

3GPP TS 23.682 v13.5.0 (Mar. 2016) (Year: 2016).*

* cited by examiner

*Primary Examiner* — Brandon M Renner
*Assistant Examiner* — Jay L Vogel

(57) ABSTRACT

Systems described herein ensure authorized communications between application servers and machine-type communications (MTC) devices. The systems store a subscriber profile for an MTC device, the subscriber profile including application server (AS) configuration information designating application servers that are authorized to connect with the MTC device. The systems receive a non-IP data delivery (NIDD) registration request from an application server, wherein the NIDD registration request includes an identifier for the MTC device. The systems obtain, from the application server, a first identifier for the application server, and retrieve, based on the NIDD registration request, the AS configuration information from the subscriber profile. The systems determine if there is a match between the AS configuration information and the first identifier for the application server, and configure a binding of the application server and an access point name (APN) for the MTC device in response to determining that there is a match.

20 Claims, 7 Drawing Sheets

HSS-BASED APPLICATION AUTHORIZATION FOR MACHINE-TYPE-COMMUNICATIONS

BACKGROUND

The Internet of Things (IoT) may be described as a network of physical objects or "things" embedded with various types of electronics, software, sensors, logic, circuitry, etc., that can collect and exchange data. A "thing" (also referred to herein as a "machine-type communication (MTC) device") may connect to a service hosted on the Internet indirectly (e.g., via another network device, such as a coordinator, a gateway, etc.) or directly.

For network service providers, MTC support involves providing network services between millions of MTC devices and application servers that collect data from (and provide data to) the MTC devices.

DETAILED DESCRIPTION OF THE PREFERRED EMBODIMENTS

The following detailed description refers to the accompanying drawings. The same reference numbers in different drawings may identify the same or similar elements.

Advanced wireless systems provide for non-Internet Protocol (non-IP) communication mechanisms between an MTC device and an application server to better support communications with MTC devices. Systems and methods described herein relate to ensuring authorized communications between application servers and machine-type communications (MTC) devices within a wireless core network.

Typically, a Service Capability Exposure Function (SCEF) in a wireless core network acts as a gateway for connecting MTC devices to application servers. The SCEF exposes application program interfaces (APIs) for application servers to access network services to communicate with MTC devices. MTC devices setup non-IP connections towards the SCEF, and the SCEF will have connectivity towards the application servers. In this way, the SCEF facilitates communication between MTC devices and application servers. Existing MTC communication procedures using an SCEF may validate an application server and may verify that an MTC device is authorized on the network. But these procedures do not ensure that a particular application server is authorized to connect with a particular MTC device. This may allow an application server to connect with an MTC device even though the application server is not authorized to do so. Implementations described herein address this by storing mapping information in the wireless core network that associates authorized MTC devices with application servers. The SCEF uses the mapping information to authorize communications between a specific application server and a specific MTC device, providing for better security for non-IP communications between MTC devices and application servers.

According to one implementation, a system may store a subscriber profile for an MTC device, the subscriber profile including application server (AS) configuration information designating application servers that are authorized to connect with the MTC device. The system may receive a non-IP data delivery (NIDD) registration request from an application server, wherein the NIDD registration request includes an identifier for the MTC device. The system may obtain, from the application server, a first identifier for the application server, and may retrieve, based on the NIDD registration request, the AS configuration information from the subscriber profile. The system may determine if there is a match between the AS configuration information and the first identifier for the application server, and when there is a match, configure a binding of the application server and an access point name (APN) for the MTC device.

Figure 1:
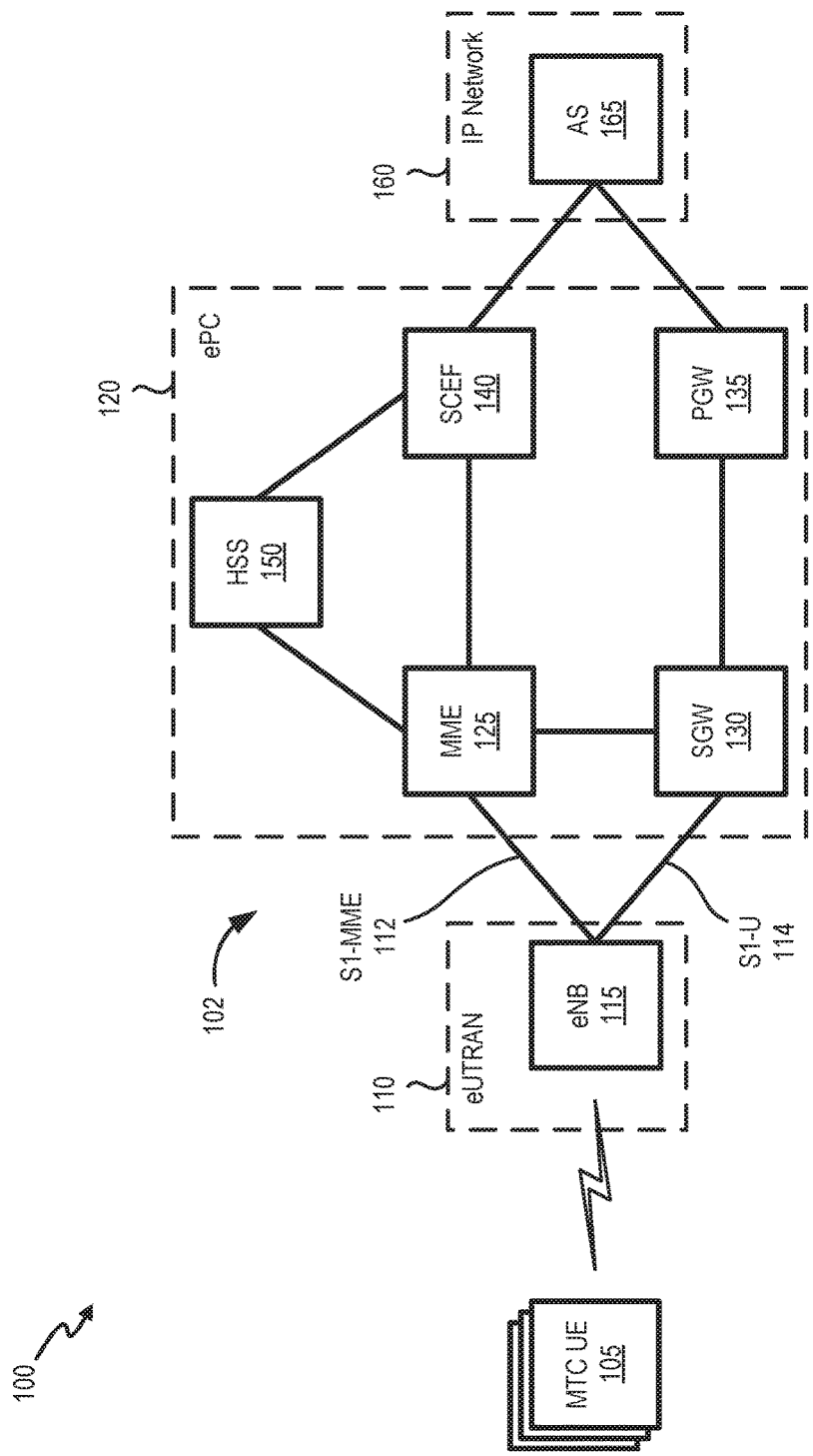
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include multiple MTC devices or MTC user equipment (UE) 105 (referred to collectively and generically as MTC UE 105); a wireless network 102 that may include an evolved UMTS Terrestrial Network (eUTRAN) 110; an evolved Packet Core (ePC) 120; and an Internet Protocol (IP) network 160.

Wireless network 102 may be a long term evolution (LTE) 4G wireless network and may include one or more devices that are physical and/or logical entities interconnected via standardized interfaces. Wireless network 102 provides wireless packet-switched services and wireless IP connectivity to user devices (such as MTC UE 105) to provide, for example, data, voice, and/or multimedia services. eUTRAN 110 may include one or more base stations 115 (e.g., an enhanced NodeB, also referred to herein as eNodeB or eNB 115). ePC 120 may further include a mobility management entity (MME) device 125, a serving gateway (SGW) device 130, a packet data network gateway (PGW) device 135, a service capability exposure function (SCEF) device 140, and a home subscriber server (HSS) device 150. The IP network 160 may further include one or more application servers (AS) 165. It is noted that FIG. 1 depicts a representative network environment 100 with exemplary components and configuration shown for purposes of explanation. Other embodiments may include additional or different network entities in alternative configurations than which are exemplified in FIG. 1.

MTC UE 105 may include a device that communicates with another device (e.g., a device connected to IP network 160) via machine-type communications. Such machine-type communications typically do not include manual human input. MTC UE 105 may include a wide range of applications for monitoring and control purposes in fields such as industrial automation, logistics, Smart Grid, Smart Cities, health, home monitoring, defense, agriculture, etc. MTC UE 105 may operate according to one or more versions of the LTE communication standard or other standards. Based on, for example, particular data types to be generated/sent by MTC UE 105, wireless network 102 may assign a non-IP access point name (APN) configuration to the subscriber profile of MTC UE 105. As described further herein, MTC UE 105 may employ a non-IP packet data network (PDN) connection to communicate with an application server (e.g., AS 165) to exchange, for example, data for various applications or services provided by MTC UE 105.

eNB 115 may include one or more devices and other components having functionality that allow MTC UE 105 to wirelessly connect to eUTRAN 110. eNB 115 may interface with ePC 120 via an S1 interface, which may be split into a control plane S1-MME interface 112 and a data (or user) plane S1-U interface 114. S1-MME interface 112 may interface with MME device 125. S1-MME interface 112 may be implemented, for example, with a protocol stack that includes a non-access stratum (NAS) protocol. S1-MME interface 112 may include multiple sub-parts, including an S1-AP interface that fulfills the S1 interface functions such as bearer management functions, initial context transfer function, mobility functions, reset functionality, NAS signaling transport function, error reporting, etc. S1-U interface 114 may interface with SGW 130 and may be implemented, for example, using a General Packet Radio Service Tunneling Protocol version 2 (GTPv2).

MME device 125 (also simply referred to as MME 125) may include a network device to implement control plane processing for ePC 120. For example, MME 125 may implement tracking and paging procedures for MTC UE 105, may activate and deactivate bearers for MTC UE 105, may authenticate a user of MTC UE 105, and may interface to non-LTE radio access networks. A bearer may represent a logical channel with particular quality of service (QoS) requirements. MME 125 may also select a particular SGW 130 for a particular MTC UE 105. A particular MME 125 may interface with other MME devices 125 (not shown) in ePC 120 and may send and receive information associated with UEs, which may allow one MME device to take over control plane processing of UEs serviced by another MME device, if the other MME device becomes unavailable.

SGW device 130 (also simply referred to as SGW 130) may provide an access point to and from MTC UE 105, may handle forwarding of data packets for MTC UE 105, and may act as a local anchor point during handover procedures between eNBs 115. SGW 130 may interface with PGW 135 (e.g., through an S5/S8 interface)

PGW device 135 (also simply referred to as PGW 135) may function s a gateway to IP network 160. A particular MTC UE 105, while shown in FIG. 1 connected to a single SGW 130, may, in some embodiments, be connected to multiple PGWs 135, one for each packet network with which MTC UE 105 communicates.

SCEF device 140 (also simply referred to as SCEF 140) may include a network or computational device that provides the capability for the creation, verification, and testing of MTC services. In one implementation, SCEF 140 may exchange control plane signaling with MME 125 and/or HSS 150. In one implementation, SCEF 140 may be included as part of a control plane bearer path between MTC UE 105 and application server 165. According to an implementation described herein, SCEF 140 acts as a gateway for connecting MTC UE 105 to AS 165. Generally, SCEF 140 may expose APIs for multiple application servers (such as AS 165) to access network services to communicate with MTC UEs 105. MTC UE 105 sets up a non-IP PDN connection towards SCEF 140, and SCEF 140 will have connectivity towards AS 165, as shown in FIG. 1. In this way, SCEF 140 may facilitate communication between MTC UE 105 and AS 140.

HSS device 150 (also simply referred to as HSS 150) may include a network or computational device that stores and distributes information associated with MTC UEs 105 and/or information associated with users/owners of MTC UE 105. For example, HSS 150 may include one or more servers that act as a central repository for user-related information. HSS 150 may store subscriber profiles that include authentication and access authorization information. As described further herein, the subscriber profiles may store AS configuration information for MTC UEs 105. The AS configuration information may include AS identifiers for application servers that are authorized to connect with a particular MTC UE 105 for a specific APN.

IP network 160 may include one or multiple networks of one or multiple types. For example, IP network 160 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. IP network 160 may include, for example, an IMS network, which may provide data and multimedia services to MTC UE 105, based on Session Initiation Protocol (SIP). As illustrated, according to an exemplary embodiment, IP network 160 includes application server 165. According to other exemplary embodiments, application server 165 and/or a portion thereof may be implemented in a different network.

Application server (AS) device 165 (also simply referred to as AS 165) may include a computational device, which may be managed, for example, by an entity different than the service provider for ePC 120. As described further herein, AS 165 may solicit, receive, and process MTC data from MTC UE 105. In one implementation, MTC UE 105 may interact with AS 165 using a non-IP bearer. Key identifiers for AS 165 may be registered and stored in a subscriber profile of HSS 150, and the key identifiers may be associated with particular MTC UEs 105 with which AS 165 is authorized to communicate.

Devices and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Still referring to FIG. 1, in architecture for machine-type communications an application server (e.g., AS 165) may connect to the Service Capability Exposure Function (e.g., SCEF 140) by sending a non-IP data delivery (NIDD) configuration request. The SCEF authenticates the AS. The AS may include (associated with the NIDD) an external identifier to refer to a UE (e.g., MTC UE 105). At this point, the SCEF sends a NIDD Authorization Request to the HSS (e.g., HSS 150). HSS validates that UE designated by the external identifier is valid. The HSS may return a corresponding network identifier for the UE, such as an International Mobile Subscriber Identity (IMSI) or a Mobile Station International Subscriber Directory Number (MSISDN).

Once this procedure is completed, the SCEF acts as the gateway and allows the UE and the AS to exchange information. While this NIDD authorization request procedure validates that a UE identifier exists in the HSS, it does not ensure that a particular AS is authorized to connect with a particular UE. This drawback may allow an AS to connect with a UE even though the AS is not authorized to do so. Thus, an AS may be allowed to send unauthorized data to a UE, and any data sent by the UE may be forwarded to the AS. From a security perspective, the failure to prevent machine-type communications from/to an unauthorized AS is highly undesirable.

According to implementations described herein, mapping information associating authorized MTC UEs, APNs, and application servers may be provisioned and stored in one or more networks device of ePC 120 (e.g., HSS 150). HSS 150 may maintain MTC UE and application authorization information and provide the information to SCEF 140 for enforcement. Thus, SCEF 140 may authorize communication between a specific AS 165 and MTC UE 105. Furthermore, centralized management of application authorization parameters can be defined on a per APN basis.

Figure 2:
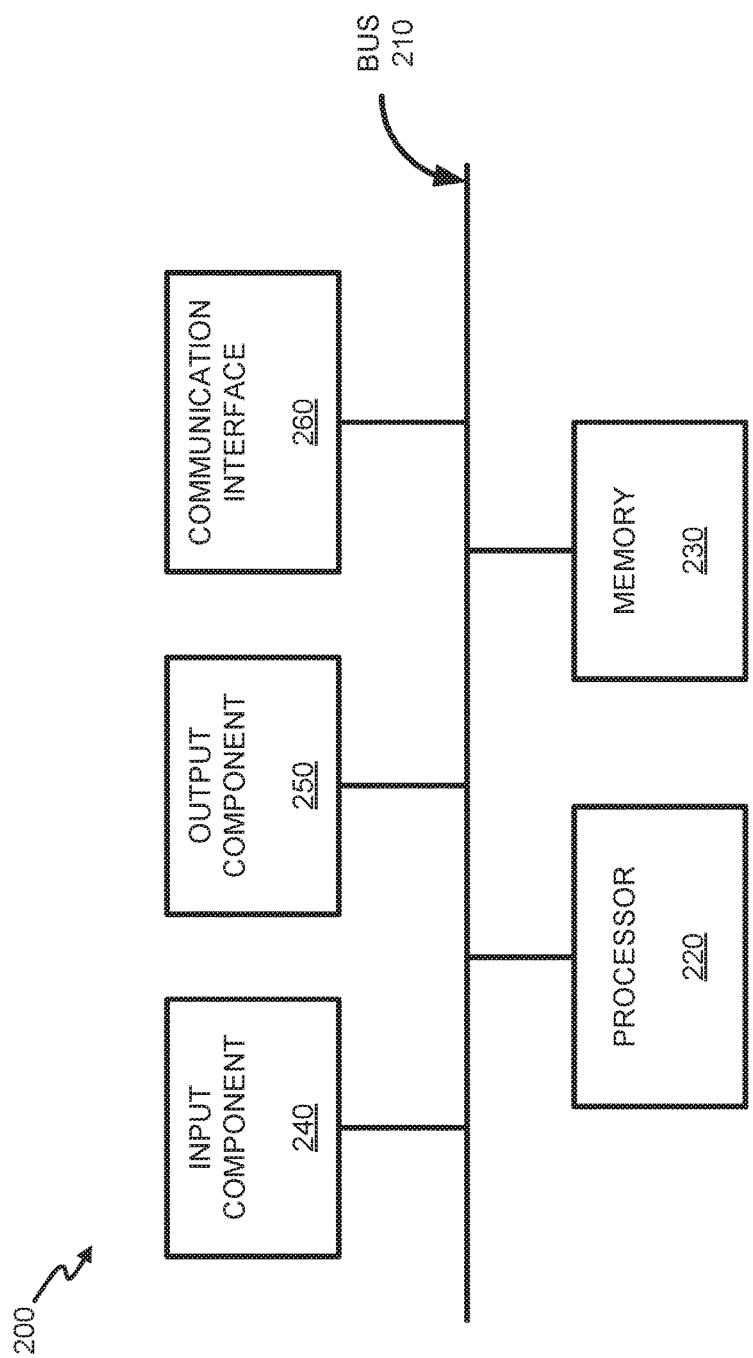
FIG. 2 is a diagram of exemplary components that may be included in a computing device included in the network environment shown in FIG. 1.

FIG. 2 is a diagram illustrating exemplary components of a device 200. Device 200 may correspond, for example, to a component of MTC UE 105, eNB 115, MME 125, SGW 130, PGW 135, SCEF 140, HSS 150, application server 165, or another component of network environment 100. Alternatively or additionally, MTC UE 105, eNB 115, MME 125, SGW 130, PGW 135, SCEF 140, HSS 150, and application server 165 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive radio frequency (RF) signals over the air. Communication interface 260 may, for example, receive RF signals and transmit them over the air to MTC UE 105/eNB 115, and receive RF signals over the air from eNB 115/MTC LE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
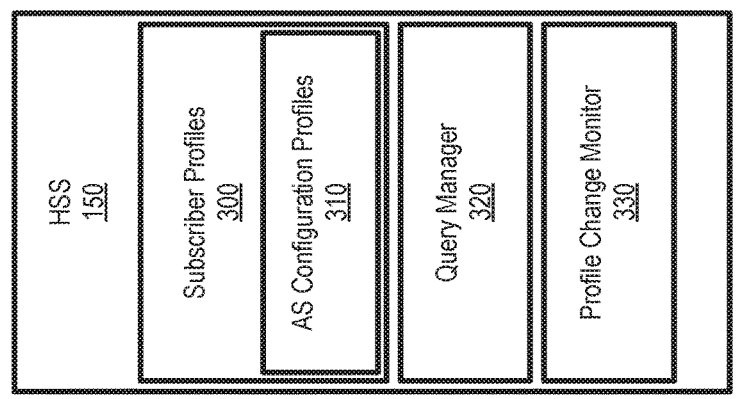
FIG. 3 is a block diagram illustrating exemplary components of the home subscriber server (HSS) of the network environment of FIG. 1.

FIG. 3 is a block diagram illustrating exemplary logical components of HSS 150. The functions described in connection with FIG. 3 may be performed by one or more components of device 200 (FIG. 2). Some or all of the logical blocks of FIG. 3 may be included, for example, in an application (e.g., software), stored in memory 230 and executed by processor 220. As shown in FIG. 3, HSS 150 may include subscriber profiles 300, AS configuration profiles 310, a query manager 320, and a profile change monitor 330. Other configurations may be implemented. Therefore, HSS 150 may include additional, fewer and/or different logical components than those depicted in FIG. 3.

Subscriber profiles 300 may include attributes for each MTC UE 105 registered with ePC 120. Profile attributes for each MTC UE 105 may include a unique device identifier (such as an IMSI, an MSISDN, a serial number, etc.) for each MTC UE 105. Profile attributes may also include, for example, the owner of MTC UE 105, a device certificate, and an IP address for MTC UE 105. Subscriber profiles 300 may be stored in a database, memory (e.g., memory 230), or another storage medium of HSS 150 or accessible by HSS 150. According to an implementation herein, subscriber profiles 300 may include AS configuration profiles 310, which identify a set of application servers (e.g., one or more AS 165) that are allowed to communicate with a specific MTC UE (e.g., MTC UE 105).

AS configuration profiles 310 may include a record of permissions for an AS (e.g., AS 165) to exchange data with an MTC UE (e.g., MTC UE 105) at the APN level. For example, AS configuration profiles 310 may include identifiers for each AS 165 that is authorized to connect with MTC UE 105 for a specific APN. As described further herein, AS configuration profiles 310 may be accessed by, for example, query manager 320 of HSS 150 in response to a request (e.g., a NIDD authorization request, etc.) from SCEF 140.

Query manager 320 may respond to requests from SCEF 140 and provide responses to SCEF 140. For example, in response to a NIDD authorization request from SCEF 140 for a particular MTC UE 105, query manager 320 may provide AS configuration information (from AS configuration profiles 310) in a NIDD authorization response. If an APN is included in the NIDD authorization request, the NIDD authorization response may include a list of authorized AS identifiers for the specific APN for the UE. If an APN is not included in the NIDD authorization request, then query manager 320 may provide AS configuration information for all APNs.

Profile change monitor 330 may monitor subscriber profiles 300 for changes and send a trigger message to SCEF 140 when there are changes to AS configuration profiles 310. The trigger message may, for example, signal that SCEF 140 needs to update any cached AS configuration information (which may be stored in AS configuration profile cache 400, described below).

Figure 4:
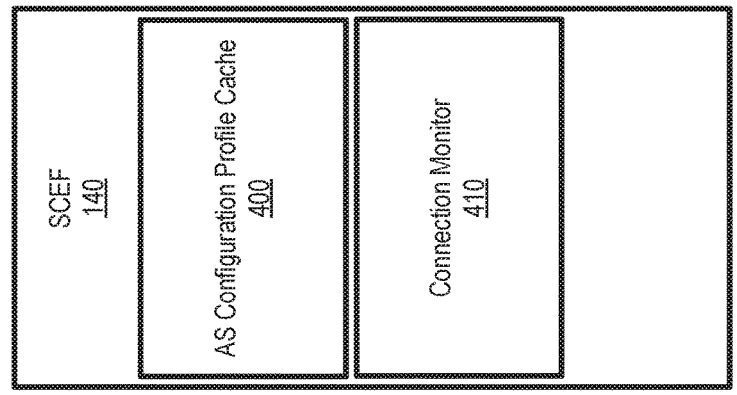
FIG. 4 is a block diagram illustrating exemplary components of the service capability exposure function (SCEF) of the network environment of FIG. 1.

FIG. 4 is a block diagram illustrating exemplary logical components of SCEF 140. The functions described in connection with FIG. 4 may be performed by one or more components of device 200 (FIG. 2). Some or all of the logical blocks of FIG. 4 may be included, for example, in an application (e.g., software), stored in memory 230 and executed by processor 220. As shown in FIG. 4, SCEF 140 may include an AS configuration profile cache 400 and a connection monitor 410. Other configurations may be implemented. Therefore, SCEF 140 may include additional, fewer and/or different logical components than those depicted in FIG. 4.

AS configuration profile cache 400 may store AS configuration information received from HSS 150 (e.g., provided in responses sent by query manager 320). AS configuration profile cache 400 may include temporary copies of AS configuration information received from HSS 150. In one implementation, AS configuration profile cache 400 may be used to respond to (or manage) connection requests from MTC UE 105 to AS 165, for example, after AS 165 has been authorized to communicated with MTC UE 105.

Connection monitor 410 may compare AS identifiers received from HSS 150 against information retrieved from AS 165. Information corresponding to the key identifiers may be provided by AS 165 in a security certificate or any other mechanism after successful authentication. Connection monitor 410 may bind (e.g., setup a session prior to communicating) the non-IP APN for MTC UE 105 and an APN for the authorized AS 165 (or multiple ASs 165). In one implementation, connection monitor 410 may limit forwarding of MTC UE 105 provided data over an APN to the set of AS 165s based on the binding created at SCEF 140. Additionally, connection monitor 410 may limit forwarding of data from AS 165 to MTC UE 105 based on the binding created at SCEF 140.

Figure 5:
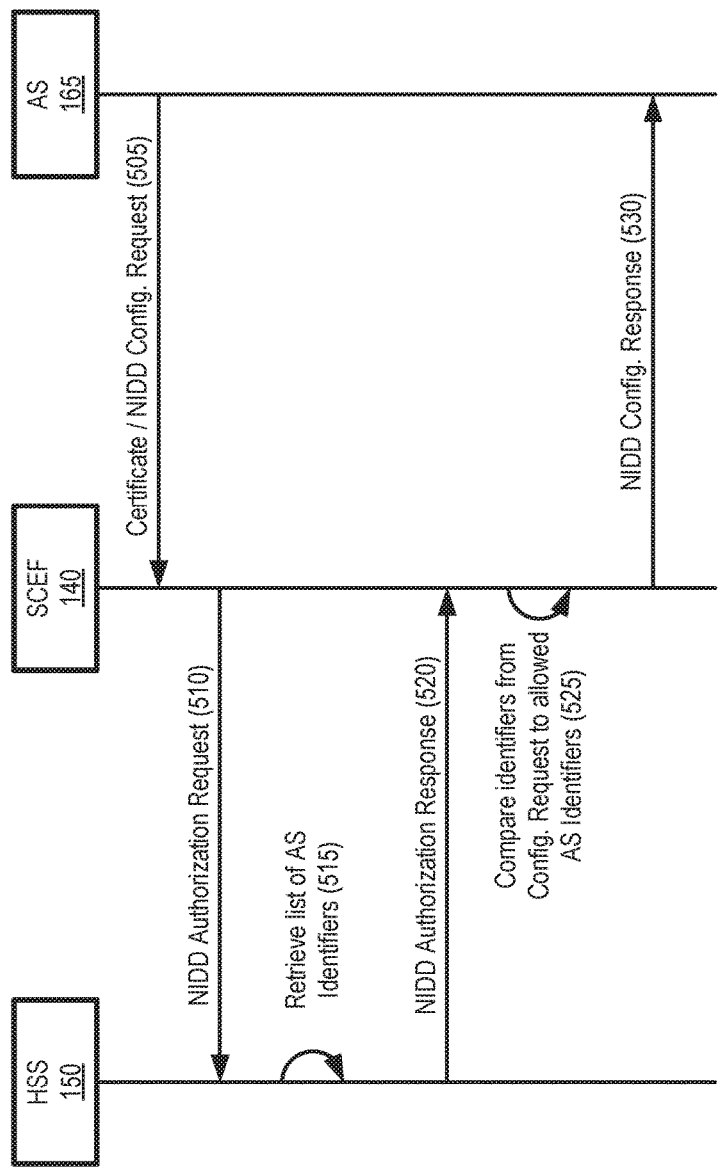
FIG. 5 is a diagram illustrating exemplary communications in a portion of the network environment of FIG. 1.
Figure 7:
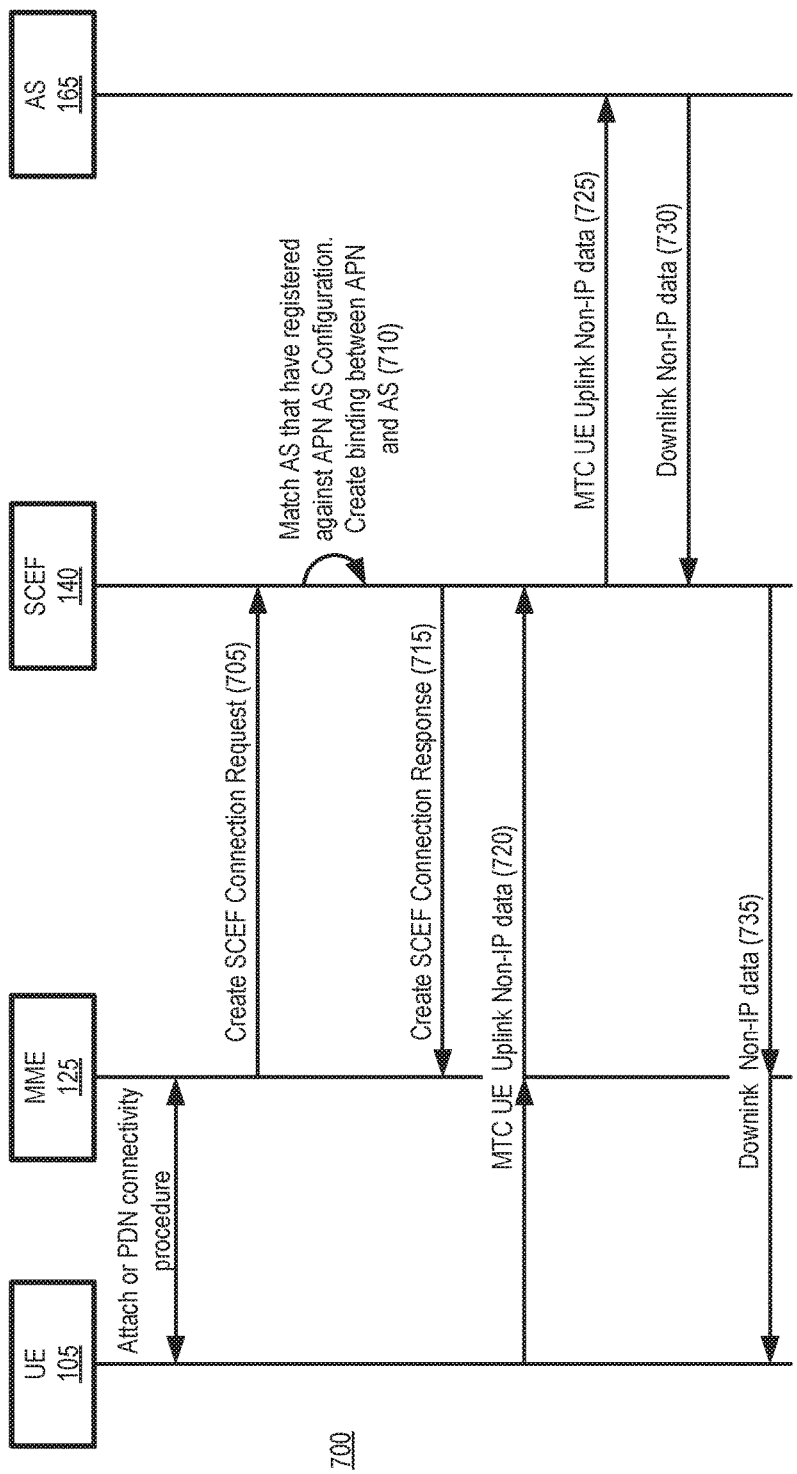
FIG. 7 is a diagram showing additional exemplary communications in another portion of the network environment of FIG. 1.

FIGS. 5 and 7 are diagrams illustrating exemplary communications between devices in portions 500 and 700 of network environment 100. Communications in FIGS. 5 and 7 represent communications for applying application authorization for MTC UEs 105 with non-IP APN configurations. More particularly, FIG. 5 represents communications for registering an application server (AS 165) with an SCEF (SCEF 140) to assign AS 165 for a particular MTC UE (e.g., MTC UE 105). As shown in FIG. 5, network portion 500 may include SCEF 140, HSS 150, and AS 165. For communications in FIGS. 5 and 7, assume AS configuration information is provisioned for MTC UEs 105 within subscriber profiles of HSS 150.

As shown in FIG. 5, AS 165 may provide a NIDD configuration request 505 to SCEF 140. NIDD configuration request 505 includes information for AS 165 to register with SCEF 140 to be able to communicate with a specific UE (e.g., MTC UE 105). NIDD configuration request 505 may include an external identifier to refer to MTC UE 105 and also may include an APN associated with MTC UE 105, if known. SCEF 140 may receive NIDD configuration request 505 and perform authentication and authorization procedures for AS 165. For authentication and data encryption purposes, SCEF 140 may evaluate AS 165's security certificate. The security certificate may be issued, for example, by a trusted registration entity or a certificate authority entity (not shown). The security certificate may provide one or more key identifiers for AS 165, such as a domain name, a company name, an address, or combinations thereof. SCEF 140 and AS 165 may also employ other mechanisms for mutual authentication. In one implementation, NIDD configuration request 505 may be provided via one or more APIs.

In response to NIDD configuration request 505, SCEF 140 may send a NIDD Authorization Request 510 to HSS 150. NIDD Authorization Request 510 may include the external identifier and the APN associated with MTC UE 105, if AS 165 previously provided the APN, for example, via NIDD configuration request 505.

HSS 150 may receive NIDD Authorization Request 510, may match the external identifier to an internal network identifier, and may determine what AS configuration information is relevant to NIDD Authorization Request 510, as indicated at reference 515. HSS 150 will not have access to identification information for the AS 165 that initiated NIDD configuration request 505, and relies on information about MTC UE 105 that is provided by SCEF 140 in NIDD Authorization Request 510. For example, HSS 150 may match the external identifier in NIDD Authorization Request 510 to a corresponding internal identifier (such as an IMSI or MSISDN) for MTC UE 105. If an APN for MTC UE 105 was provided in NIDD Authorization Request 510, HSS 150 may retrieve (e.g., from AS configuration profiles 310) a list of allowed AS identifiers for the specific APN for MTC UE 105. Conversely, if an APN was not provided in NIDD Authorization Request 510 HSS 150 may retrieve (e.g., from AS configuration profiles 310) a list of AS Configuration information for all APNs associated with MTC UE 105. In one implementation, HSS 150 may mark the APNs associated with MTC UE 105 as registered.

Based on the determination 515 above, HSS 150 may generate an NIDD authorization response 520 that includes either the list of allowed AS identifiers for the specific APN or a list of allowed AS identifiers for all APNs associated with MTC UE 105. NIDD authorization response 520 may be provided to SCEF 140.

Figure 6:
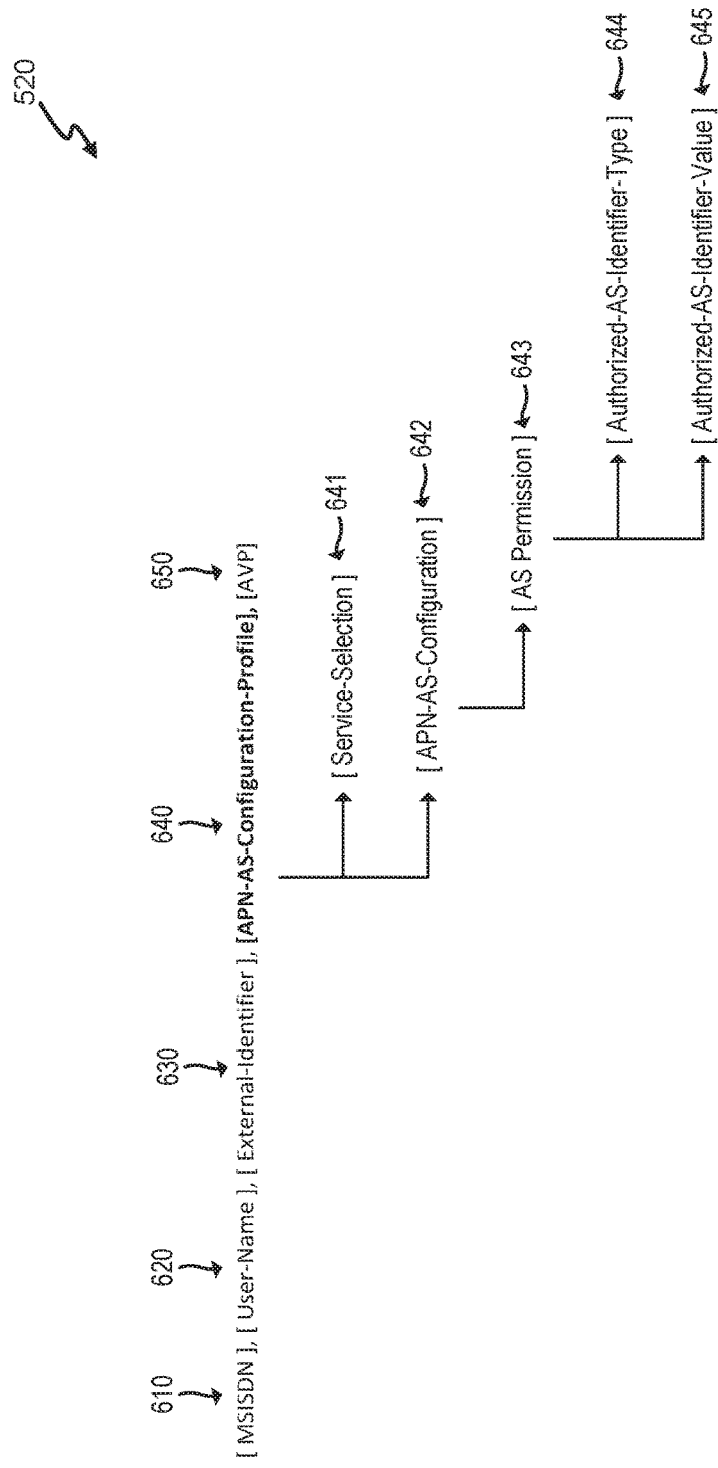
FIG. 6 is a diagram showing exemplary parameters in one of the communications of FIG. 5.

FIG. 6 includes an example of parameters that may be used for NIDD authorization response 520. In one implementation, parameters of NIDD authorization response 520 may be implemented as Attribute-Value Pairs (AVPs). As shown in FIG. 6, NIDD authorization response 520 may include an MSISDN parameter field 610, a user-name parameter field 620, an external identifier parameter field 630, an APN-AS configuration profile parameter field 640, and an AVP parameter field 650.

MSISDN parameter field 610 may include an MSISDN for MTC UE 105 (e.g., that corresponds to an external identifier provided for MTC UE 105). User-name parameter field 620 may include a user name associated with a subscriber or user of MTC UE 105. External identifier parameter field 630 may include an external identifier associated with MTC UE 105. The external identifier may correspond, for example, to a unique identifier that AS 165 uses for MTC UE 105 in NIDD configuration request 505.

APN-AS configuration profile parameter field 640 may include a service selection parameter field 641 and an APN-AS configuration parameter field 642. Service selection parameter field 641 may include an APN name for MTC UE 105. AVP parameter field 642 may include an AS permission parameter field 643, which identifies one or more application servers with which MTC UE 105 is authorized to communicate. AS permission parameter field 643 may include an authorized AS identifier-type field 644 and an authorized AS identifier-value field 645. Authorized AS identifier-type field 644 may include enumerated fields of key identifiers for an authorized AS 165, such as fields in a corresponding AS security certificate including a subject field, issued-to field, domain field, etc. Authorized AS identifier-value field 645 may include an authorized value for fields in Authorized AS identifier-type field 644, such as a domain name, address, or APN for an authorized application server (e.g., "group.company.com.")

The parameters and fields provided in FIG. 6 are exemplary. In other implementations, different or additional parameters and fields may be used for NIDD authorization response 520.

Returning to FIG. 5, SCEF 140 may receive NIDD authorization response 520. In response, as indicated by reference 525, SCEF 140 may retrieve key identifiers from the certificate provided by AS 165 during NIDD configuration request 505. SCEF 140 will attempt to match the key identifiers from the certificate against AS identifiers included in NIDD authorization response 520. Additionally, or alternatively, SCEF 140 may retrieve key identifiers from AS 165, to compare with NIDD authorization response 520, using other mechanisms after successful authentication, such as using pre-shared keys. In the case of certificates, examples of key identifiers that could match AS identifiers in NIDD authorization response 520 include, for example, an "Issued To" field, a "Subject" field, or any proprietary key that has been added to the certificate. SCEF 140 may also use this information to identify the APN for which AS 165 is authorized, if necessary.

If key identifiers in the certificate match any of the AS identifiers provided by HSS 150 in NIDD authorization response 520, then SCEF 140 may authorize AS 165 to communicate with MTC UE 105. SCEF 140 may forward the authorization via NIDD configuration response 530.

FIG. 7 represents communications for registering the MTC UE (e.g., MTC UE 105) with the SCEF (SCEF 140) to indicate the availability of a bearer for SCEF 140 to reach MTC UE 105. Referring to FIG. 7, network portion 700 may include MTC UE 105, MME 125, SCEF 140, and AS 165. Assume communications in FIG. 7 occur after communications in FIG. 5, such as after MTC UE 105 and MME 125 exchange communications to attach via, for example, a PDN connectivity procedure. MTC UE 105 initiates a non-IP PDN connection causing MME 125 to create an SCEF connection request 705. The SCEF connection request includes the APN name for MTC UE 105.

As indicated by reference 710, based on information from NIDD authorization response 520 described above, SCEF 140 may identify ASs 165 that have been authorized for the specific APN in SCEF connection request 705. SCEF 140 may create a binding between that specific APN and AS 165. If SCEF 140 does not already have AS configuration profiles (e.g., if AS 165 has not already registered with SCEF 140 for the specific MTC UE 105 or if profile change monitor 330 has indicated an intervening profile change), SCEF 140 may retrieve this information from HSS 150 (not shown in FIG. 7). SCEF 140 may then create and send an SCEF connection response 715 to MME 125 to complete registration or MTC UE 105 and allow communications between MTC UE 105 and AS 165.

Still referring to FIG. 7, once registrations of AS 165 (FIG. 5) and registration of MTC UE 105 (above) are complete, MTC UE 105 may send uplink non-IP data to AS 165. More particularly, MME 125 may receive uplink non-IP data and forward the uplink non-IP data to SCEF 140 (reference 720). SCEF 140 may deliver the uplink non-IP data to AS 165 (reference 725), using, for example, information provided by AS 165 in NIDD configuration request 505 and the binding between the specific APN and AS 165. Similarly, AS 165 may send downlink non-IP data to MTC UE 105. More particularly, SCEF 140 may receive downlink non-IP data from AS 165 (reference 730). SCEF 140 may forward the downlink non-IP data to MME 125 (reference 735), using, for example, information provided by MME 125 in SCEF configuration request 705 and the binding between the specific APN and AS 165. MME 125 may forward the downlink non-IP data to MTC UE 105.

The communications examples in FIGS. 5 and 7 show the first exchange of AS configuration information between HS 150 and SCEF 140 (e.g., at reference 520) is initiated by a request from AS 165 (e.g. using NIDD configuration request 505). In other implementations, the first exchange of AS configuration information between HS 150 and SCEF 140 may be initiated by a request from MME 125 (e.g., SCEF connection request 705). Thus, variations in the order of communications in FIGS. 5 and 7 are possible.

Figure 8:
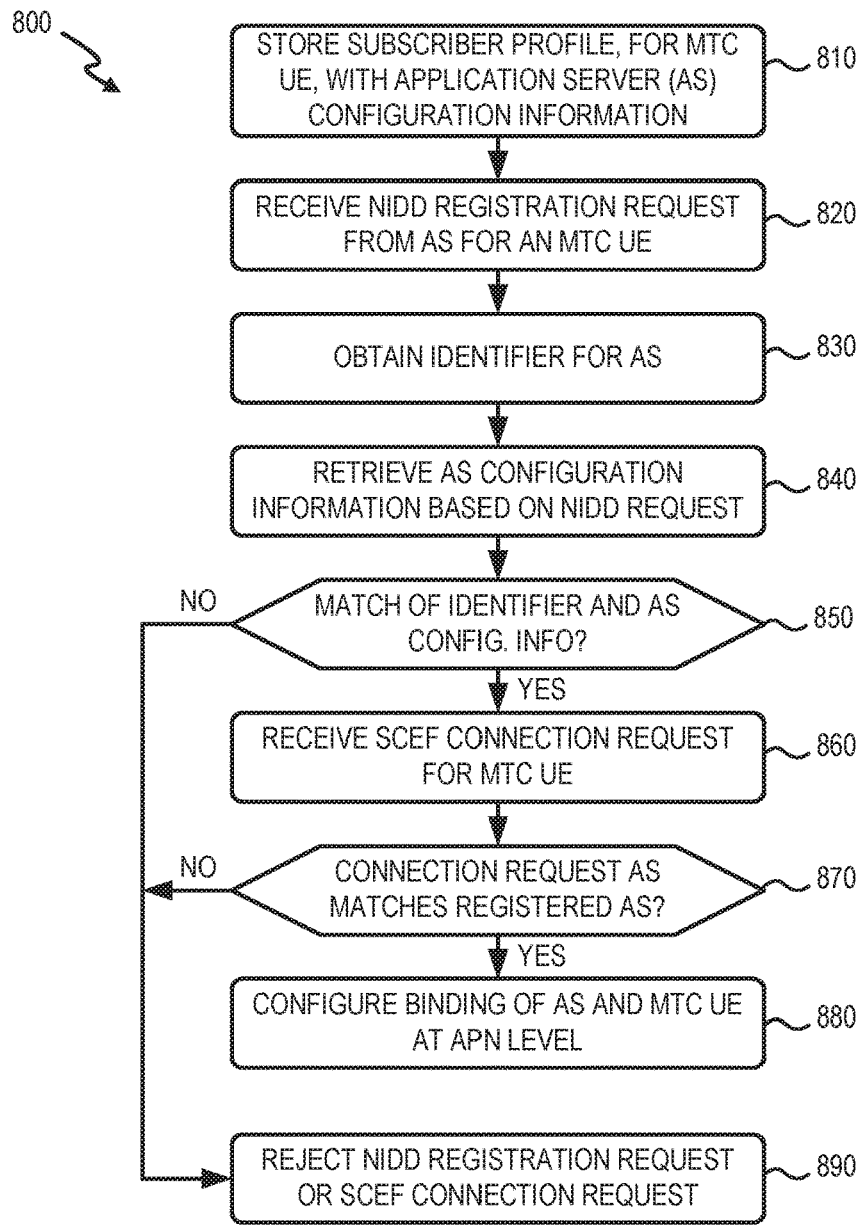
FIG. 8 is a flow diagram illustrating an exemplary process for HSS-based application authorization with machine-type communications, according to an implementation described herein.

FIG. 8 is a flow diagram illustrating an exemplary process 800 for HSS-based application authorization, according to an implementation described herein. In one implementation, process 800 may be implemented by HSS 150. In another implementation, process 800 may be implemented by HSS 150 in conjunction with one or more other devices in network environment 100, such as MME 125 or SCEF 140.

Referring to FIG. 8, process 800 may include storing a subscriber profile, for an MTC UE, with AS configuration information (block 810). For example, HSS 150 may receive and store a subscriber profile 300 for MTC UE 105 that includes permissions for one or more application servers to connect with MTC UE 150 at the APN level.

Process 800 may further include receiving an NIDD registration request from the AS for an MTC UE (block 820), and obtaining an identifier for the MTC UE (block 830). For example, SCEF 140 may receive an NIDD request from AS 165. The NIDD request may include information for AS 165 to register with SCEF 140 to be able to communicate with a specific UE (e.g., MTC 105). SCEF 140 may perform authentication and authorization procedures for AS 165, including, for example, a security certificate for AS 165 that includes an AS identifier.

Process 800 may also include retrieving configuration information based on the NIDD request (block 840), and determining if there is a match of the AS identifier with the configuration information (block 850). For example, SCEF 140 may forward a NIDD authorization request to HSS 150, causing HSS 150 to retrieve AS configuration information (e.g., a list of AS identifiers) for the MTC UE 105 that was identified in the NIDD authorization request. HSS 150 may provide the configuration information to SCEF 140, and SCEF 140 may perform a comparison of the list of AS identifiers with the AS identifier retrieved from the security certificate.

If there is a match of the AS identifier with the configuration information (block 850—Yes), process 800 may include receiving an SCEF connection request for the MTC UE (block 860), and determining if the AS in the connection request matched the registered AS (block 870). For example, at a time after AS 165 is successfully registered, MME 125 may send an SCEF connection request to SCEF 140. The SCEF connection request may indicate a particular MTC UE 105 and application server identifier. SCEF 140 may determine if the application server identifier in the SCEF connection request matches an identifier from the previous registration of AS 165.

If the AS in the connection request matches the registered AS (block 870—Yes), process 800 may include configuring a binding of the AS and the MTC UE at the APN level (block 880). For example, when SCEF 140 confirms a match between the requested AS 165 from MTC UE 105 and the registered AS 165, SCEF 140 may create a binding between a specific APN for MTC UE 105 and AS 165.

If there is not a match of the AS identifier with the configuration information (block 850—No) or if the AS in the connection request does not match the registered AS (block 870—No), process 800 may include rejecting the NIDD registration request or the SCEF connection request (block 890). For example, if there is not a match of the AS identifier from the MTC UE side and the AS side, SCEF 140 will prevent communications between the MTC UE 105 and AS 165.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 8, and message/operation flows with respect to FIGS. 5 and 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   storing, by a first network device in a core network, a subscriber profile for a machine-type communication (MTC) device, the subscriber profile including application server (AS) configuration information designating application servers that are authorized to connect with the MTC device;
   receiving, by a second network device in the core network, a non-Internet Protocol (IP) data delivery (NIDD) registration request from an application server, wherein the NIDD registration request includes an external identifier for the MTC device;
   forwarding, by the second network device to the first network device, the NIDD registration request;
   forwarding, by the first network device to the second network device and in response to the NIDD registration request, the AS configuration information;
   caching, by the second network device, the AS configuration information;
   detecting, by the first network device, a change to the AS configuration information;
   sending, by the first network device and to the second network device, a trigger message to update the cached AS configuration information in response to the detecting;
   obtaining, by the second network device and from the application server, a first identifier for the application server;
   determining, by the second network device and based on the cached AS configuration information, if there is a match between the AS configuration information and the first identifier for the application server; and
   configuring a binding, by the second network device, of the application server and an access point name (APN) for the MTC device, in response to determining that there is a match.

2. The method of claim 1, wherein the first network device includes a home subscriber server (HSS) device of an evolved packet core network and the second network device includes a service capability exposure function (SCEF) device of the evolved packet core network, the method further comprising:
permitting communications between the application server and the MTC device after configuring the binding.

3. The method of claim 2, wherein the subscriber profile is stored in a local memory of the HSS device.

4. The method of claim 1, wherein forwarding the AS configuration information further comprises:
forwarding, via a NIDD authorization response, a list of allowed AS identifiers for the APN for the MTC device.

5. The method of claim 1, wherein forwarding the AS configuration information further comprises:
forwarding, via a NIDD authorization response, a list of allowed AS identifiers for multiple APNs associated with the MTC device.

6. The method of claim 1, wherein the AS configuration information further includes the APN associated with the MTC device.

7. The method of claim 1, wherein the first identifier is included within a security certificate for the application server.

8. The method of claim 1, further comprising:
receiving, by the second network device, a connection request from a mobility management entity (MME) device associated with the MTC device; and
matching, by the second network device, the application server to the APN for the MTC device.

9. The method of claim 1, further comprising:
receiving, by the second network device and after configuring the binding, uplink data from the MTC device; and
authorizing, by the second network device and based on the binding, forwarding of the uplink data to the application server.

10. The method of claim 1, further comprising:
receiving, by the second network device and after configuring the binding, downlink data from the application server; and
authorizing, by the second network device and based on the binding, forwarding of the downlink data to toward the MTC device.

11. A system comprising:
a first network device in a core network, including:
one or more first memories to store first instructions; and
one or more first processors to execute the first instructions to:
store a subscriber profile for a machine-type communication (MTC) device, the subscriber profile including application server (AS) configuration information designating application servers that are authorized to connect with the MTC device;
forward, to a second network device in the core network and in response to a non-IP data delivery (NIDD) registration request, the AS configuration information;
detect a change to the AS configuration information; and
send, to the second network device, a trigger message to update the AS configuration information in response to the detecting; and
the second network device, including:
one or more second memories to store second instructions; and
one or more second processors to execute the second instructions to:
receive the NIDD registration request from an application server, wherein the NIDD registration request includes an external identifier for the MTC device;
forward, to the first network device, the NIDD registration request;
cache the AS configuration information;
obtain, from the application server, a first identifier for the application server;
determine, based on the cached AS configuration information, if there is a match between the AS configuration information and the first identifier for the application server; and
configure a binding of the application server and an access point name (APN) for the MTC device, in response to determining that there is a match.

12. The system of claim 11, wherein the first network device includes a home subscriber server (HSS) device and the second network device includes a service capability exposure function (SCEF) device.

13. The system of claim 12, wherein the subscriber profile is stored in a local memory of the HSS device.

14. The system of claim 11, wherein, when forwarding the AS configuration information, the one or more first processors are further to execute the instructions to:
forward, via a NIDD authorization response, a list of allowed AS identifiers for the APN for the MTC device.

15. The system of claim 11, wherein, when forwarding the AS configuration information, the one or more first processors are further to execute the instructions to:
forward, via a NIDD authorization response, a list of allowed AS identifiers for multiple APNs associated with the MTC device.

16. The system of claim 11, wherein the AS configuration information further includes the APN associated with the MTC device.

17. The system of claim 11, wherein the first identifier is included within a security certificate for the application server.

18. The system of claim 11, wherein the one or more first processors are further to execute the first instructions to:
receive a connection request from a mobility management entity (MME) device associated with the MTC device; and
match the application server to the APN for the MTC device.

19. A non-transitory computer-readable medium containing instructions executable by at least one processor, the computer-readable medium comprising one or more instructions to:
store, by a first network device of a core network, a subscriber profile for a machine-type communication (MTC) device, the subscriber profile including application server (AS) configuration information designating application servers that are authorized to connect with the MTC device;
receive, by a second network device of the core network, a non-IP data delivery (NIDD) registration request from an application server, wherein the NIDD registration request includes an identifier for the MTC device;
forward, by the second network device to the first network device, the NIDD registration request;

forward, by the first network device to the second network device and in response to the NIDD registration request, the AS configuration information;

cache, by the second network device, the AS configuration information;

detect, by the first network device, a change to the AS configuration information;

send, by the first network device and to the second network device, a trigger message to update the cached AS configuration information in response to the detecting;

obtain, from the application server, a first identifier for the application server;

determine, based on the cached AS configuration information, if there is a match between the AS configuration information and the first identifier for the application server; and configure a binding of the application server and an access point name (APN) for the MTC device, in response to determining that there is a match.

20. The non-transitory computer-readable medium claim 19, further comprising one or more instructions to:

receive after configuring the binding, uplink data from the MTC device; and authorize, based on the binding, forwarding of the uplink data to the application server.

* * * * *